US011568346B2

(12) United States Patent
Shin et al.

(10) Patent No.: US 11,568,346 B2
(45) Date of Patent: Jan. 31, 2023

(54) SYSTEM AND METHOD FOR SAFETY MANAGEMENT

(71) Applicant: LG ELECTRONICS INC., Seoul (KR)

(72) Inventors: Won Ho Shin, Seoul (KR); Ji Chan Maeng, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 580 days.

(21) Appl. No.: 16/577,870

(22) Filed: Sep. 20, 2019

(65) Prior Publication Data

US 2020/0019905 A1    Jan. 16, 2020

(30) Foreign Application Priority Data

Jun. 21, 2019    (KR) .................... 10-2019-0074301

(51) Int. Cl.
| | | |
|---|---|---|
| G06Q 10/00 | (2012.01) | |
| G06Q 10/06 | (2012.01) | |
| G06Q 50/26 | (2012.01) | |
| H04W 4/90 | (2018.01) | |
| H04W 76/50 | (2018.01) | |

(Continued)

(52) U.S. Cl.
CPC ........... *G06Q 10/0635* (2013.01); *G06N 3/08* (2013.01); *G06Q 50/265* (2013.01); *G06V 10/17* (2022.01); *H04W 4/90* (2018.02); *H04W 76/50* (2018.02)

(58) Field of Classification Search
None
See application file for complete search history.

(56) References Cited

U.S. PATENT DOCUMENTS 9,817,843 B2 * 11/2017 Mukherjee ............ H04L 67/306
9,849,364 B2 * 12/2017 Tran ........................ A61B 5/11

(Continued)

FOREIGN PATENT DOCUMENTS

KR    10-2015-0039467 A    4/2015

OTHER PUBLICATIONS

Lee, Jaewoon, et al. "Sustainable wearables: Wearable technology for enhancing the quality of human life." Sustainability 8.5 (2016): 466. (Year: 2016).*

(Continued)

*Primary Examiner* — Gurkanwaljit Singh
(74) *Attorney, Agent, or Firm* — Birch, Stewart, Kolasch & Birch, LLP

(57) ABSTRACT

The present disclosure relates to a safety management system. The safety management system calculates a real-time data risk score and an incident data risk score based on real-time data received from a wearable device and incident data selected from big data, calculates a total risk score by summing all values obtained by multiplying calculated risk for respective data by weights for respective data, compares the total risk store with a preset threshold score, and transmits a dangerous situation message to a risk recognition subject when it is determined that a user is at risk. The safety management system of the present disclosure may transmit the real-time data, the incident data, and the dangerous situation message using a 5G communication system, and a safety management server for determining whether or not the user is at risk may be implemented using an artificial neural network.

14 Claims, 8 Drawing Sheets

(51) Int. Cl.
*G06N 3/08* (2006.01)
*G06V 10/10* (2022.01)

(56) References Cited

U.S. PATENT DOCUMENTS

| | | | | |
|---|---|---|---|---|
| 2012/0123806 | A1* | 5/2012 | Schumann, Jr | G06Q 40/08 705/4 |
| 2015/0025917 | A1* | 1/2015 | Stempora | G06Q 40/08 705/4 |
| 2015/0106947 | A1* | 4/2015 | Holman | G06F 21/6245 726/26 |
| 2015/0156567 | A1* | 6/2015 | Oliver | G08B 21/0227 340/870.07 |
| 2016/0092469 | A1* | 3/2016 | Mukherjee | H04W 4/02 705/325 |
| 2017/0006135 | A1* | 1/2017 | Siebel | H04L 67/12 |
| 2017/0232300 | A1* | 8/2017 | Tran | A63B 60/16 434/247 |
| 2018/0001184 | A1* | 1/2018 | Tran | A63B 71/145 |
| 2018/0053394 | A1* | 2/2018 | Gersten | G08B 21/10 |
| 2018/0176727 | A1* | 6/2018 | Williams | G16H 50/30 |
| 2018/0240028 | A1* | 8/2018 | Baracaldo Angel | H04M 3/2281 |
| 2018/0264347 | A1* | 9/2018 | Tran | G06F 3/00 |
| 2019/0034157 | A1* | 1/2019 | Steinberg | G06Q 50/30 |
| 2019/0209022 | A1* | 7/2019 | Sobol | A61B 5/6804 |
| 2019/0340906 | A1* | 11/2019 | Williams | G08B 21/0277 |
| 2019/0347431 | A1* | 11/2019 | Nair | H04W 12/64 |

OTHER PUBLICATIONS

Sogi, Navya R., et al. "SMARISA: a raspberry pi based smart ring for women safety using IoT." 2018 International Conference on Inventive Research in Computing Applications (ICIRCA). IEEE, 2018. (Year: 2018).*

Mensinkai, Kiran, et al. "An intelligent safety system for individual's security." 2017 International Conference on Energy, Communication, Data Analytics and Soft Computing (ICECDS). IEEE, 2017. (Year: 2017).*

Paradkar, Abhijit, and Deepak Sharma. "All in one intelligent safety system for women security." International journal of computer applications 130.11 (2015): 33-40. (Year: 2015).*

* cited by examiner

SYSTEM AND METHOD FOR SAFETY MANAGEMENT

CROSS-REFERENCE TO RELATED APPLICATION

The present application claims benefit of priority to Korean Patent Application No. 10-2019-0074301, filed on Jun. 21, 2019 in the Korean Intellectual Property Office, the entirety of which is incorporated by reference herein.

BACKGROUND

1. Technical Field

The present disclosure relates to a safety management system and method, and more particularly, to a safety management system and method for determining whether or not a user is at risk using real-time data and incident data.

2. Description of Related Art

In modern society, various safety accidents and crime incidents occur and the frequency thereof is increasing, so there is a need for a way to avoid dangerous situations.

Analog methods, such as a method of being aware of a statistically dangerous street or crime-ridden district in advance and avoiding it, and a method of causing an unhealthy person to pay attention not to raise a blood pressure or heart rate, may be used. However, there is increasing interest in methods of avoiding risks more easily and accurately.

Various studies are being conducted to develop a method for determining whether a user is currently in a dangerous situation using, for example, information obtained via wearable devices, such as smart glasses, smart phones, and smart bands mounted on the user's body or carried by the user.

As a related art, Korean Patent Application Publication No. 10-2015-0039467 discloses a risk notification method. In this related art, when user moves within interest section set by mobile terminal, detect a user's situation by wearable device. And when the user's situation is judged to be dangerous via the mobile terminal's decision based on data obtained by wearable device in real time, alert the situation to a family or a rescue center. However, Korean Patent Application Publication No. 10-2015-0039467 does not comprehensively consider past incident and crime data when taking into account the probability of an incident occurring depending on the place where the user is located. Further, Korean Patent Application Publication No. 10-2015-0039467 does not disclose a specific calculation method or the like for determining a dangerous situation.

SUMMARY OF THE INVENTION

An aspect of the present disclosure is to solve the problem that the current data around the user obtained using a device or the like and past incident and crime data cannot be considered in a comprehensive manner in order to determine whether or not a user is at risk.

Another aspect of the present disclosure is to solve a problem in which it is impossible to consider the fact that the importance of real-time data for determining whether or not a user is at risk depends on a user's situation.

Another aspect of the present disclosure is to solve the problem in which it is impossible to consider the fact that the importance of past incident data for determining whether or not a user is at risk depends on the distance between an incident occurrence point and the user.

Another aspect of the present disclosure is to solve the problem in which, even though it may be possible to determine that a user is at risk based on a total risk score calculated using multiple pieces of data, it is impossible to determine whether or not the user is at risk considering only a risk score in individual body data, such as the blood pressure of the user.

Another aspect of the present disclosure is to solve the problem in which, when real-time data is not received from a wearable device, suitable measures are not taken despite the high probability that the user is experiencing a problem.

Another aspect of the present disclosure is to solve the problem in which it is impossible to detect and provide notification as to whether a criminal is present near a user despite the high probability that the user will be placed in a dangerous situation when a criminal such as an ex-convict or a wanted person is present in the vicinity of the user.

Another aspect of the present disclosure is to solve the problem in which, even though the user is in a very high level of risk, the user may not be aware of a practical situation since it is determined that the user is not at risk in the case in which whether or not the user is at risk is only determined and notified.

The present disclosure are not limited to those described above, and other aspects, which are not described above, may be clearly understood by a person ordinarily skilled in the art from the following description.

In order to solve the problems described above, a safety management system according to an embodiment of the present disclosure includes a wearable device, and a safety management server configured to determine whether or not a user is at risk and to transmit a dangerous situation message to a risk recognition subject.

Specifically, the safety management system may include: the wearable device carried by a user, and including a sensor configured to obtain real-time data and a device communication unit configured to perform data transmission/reception with an external server; and a safety management server configured to receive risk determination data including the real-time data and incident data selected from big data, to calculate an incident score, and to determine whether the user is at risk based on the calculated risk score.

In addition, a calculator of the safety management server may use preset risk score reference values for respective data and preset weights for respective data in order to calculate the risk score, and a determinator of the safety management server may determine that the user is at risk when the calculated total risk score is equal to or greater than a preset threshold risk score, and may transmit a dangerous situation message to a risk recognition subject when it is determined that the user is at risk.

As the real-time data for calculating the total risk score, at least one of user surrounding-environment data and the user body data may be used.

In addition, the environment data may include at least one of time information, illuminance information, sound information, and position information, the body data may include at least one of heart rate information, blood pressure information, and body temperature of the user, and the incident data may include at least one of safety accident information and criminal incident information.

In addition, the real-time data weight may be set in proportion to the reliability of the wearable device, which measures the real-time data, the reliability of the wearable device may be set based on at least one of time information, user position information, and user surrounding-environment information, and the incident data weight may be set to be in inverse proportion to the distance between an incident occurrence position and the user.

In addition, when any one risk score of user body data is equal to or greater than a predetermined threshold score for each body data, the determinator may determine that the user is at risk.

In addition, when the real-time data is not received from the wearable device, the determinator may determine that the user is at risk.

In addition, when data captured by the wearable device and criminal image data stored in the risk management server are compared and determined to be equal to each other, it may be determined that the user is at risk because a criminal is present in the vicinity of the user.

In addition, the determinator may determine a risk level of the user's situation, and even when it is determined that the user is not at risk, the determinator may transmit the risk level information to the risk recognition subject.

In addition, the safety management server may be implemented using an artificial neural-network algorithm.

In addition, the server communication unit and the device communication unit may perform data transmission/reception using a 5G communication system.

A safety management method according to an embodiment of the present disclosure for solving the problems described above includes: a step of inputting risk determination data to a risk management server; a step of storing the risk determination data in the risk management server; a step of calculating a total risk score by the risk management server; a step of determining whether or not the user is at risk by the risk management server; and a step of transmitting a dangerous situation message from the risk management server to the risk recognition subject when it is determined that the user is at risk.

In addition, the risk determination data includes real-time data obtained via the wearable device and incident data selected from big data, the total risk score is calculated using preset reference values for respective data and preset weights for respective data, and when the total risk score is equal to or greater than a preset threshold risk score, it may be determined that the user is at risk.

Details of other embodiments for solving the problems are included in the description and drawings of the disclosure.

As described above, according to the safety management system and the method of the present disclosure, it is possible to improve risk determination accuracy by considering real-time data and incident data together in order to determine whether the user is at risk.

In addition, since a real-time data weight is set differently by setting the reliability of a wearable device differently depending on the user's situation, it is possible to improve the risk determination accuracy by considering the specific situation of the user.

In addition, since the incident data weight is set differently depending on the distance between the incident occurrence position and the position of the user, it is possible to improve the accuracy of calculation of the probability of occurrence of an incident and the risk determination accuracy.

In addition, in determining the risk of the user, the total risk score and the individual body data risk score are taken into consideration together. Thus, it is possible to improve the risk determination accuracy depending on the individual dangerous situation, and to protect the user more assuredly.

In addition, since the case in which real-time data is not received from the wearable device carried by the user in order to determine whether or not the user is at risk is considered, it is possible to take measures to protect the user when the wearable device fails or is forcibly separated from the user because the user is in trouble.

Furthermore, it is possible to avoid a place in which the user is likely to be in a dangerous situation since it is determined whether the user is at risk based on whether or not a criminal is present in the vicinity of the user.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
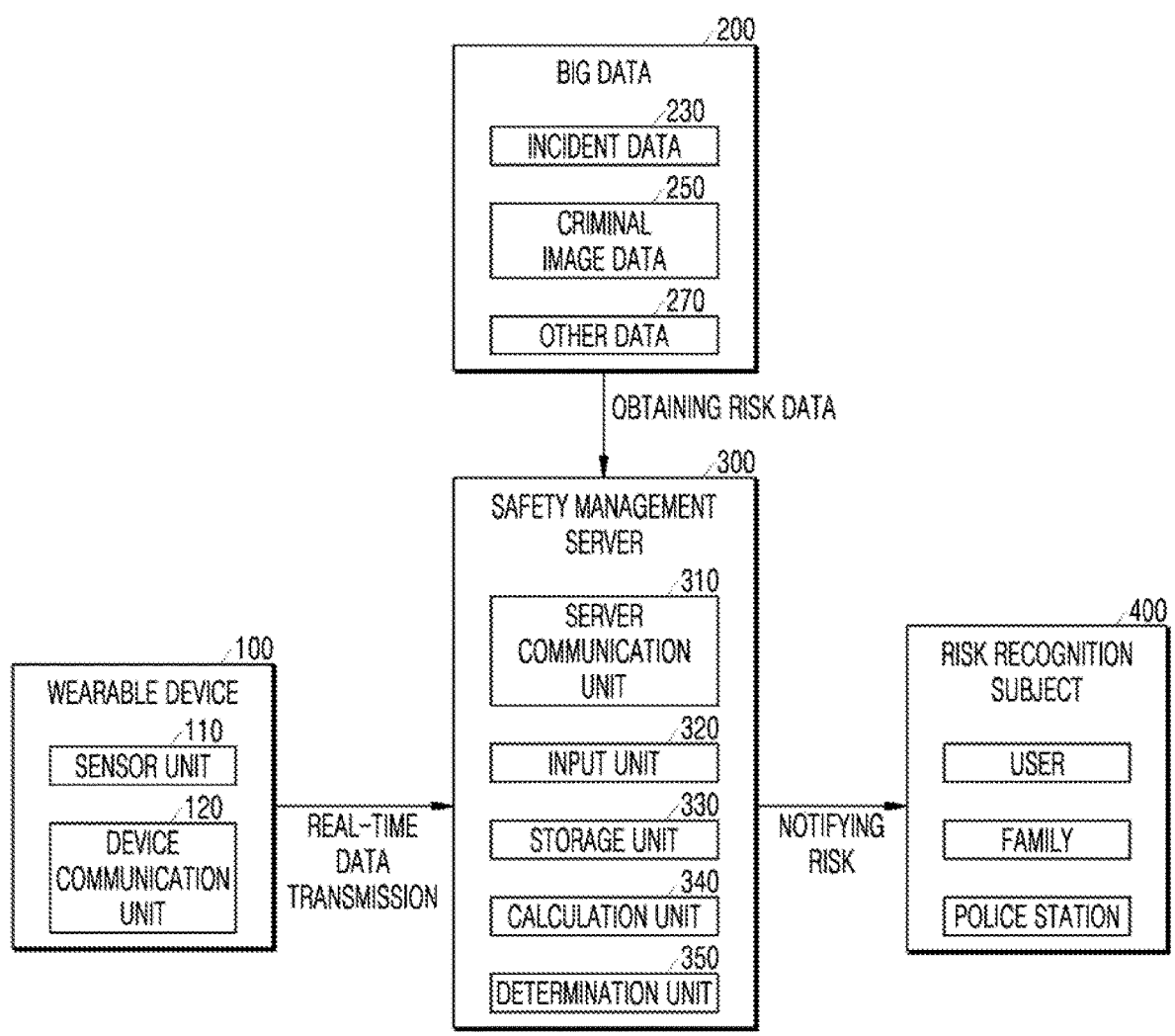
FIG. 1 is a block diagram illustrating a safety management system according to an embodiment of the present disclosure.

Hereinafter, embodiments of the present disclosure will be described in detail with reference to the accompanying drawings. However, the present disclosure is not limited to the embodiments described herein, but may be implemented in other forms. Rather, the embodiments disclosed herein are provided so as to make this disclosure thorough and complete and to help a person ordinarily skilled in the art fully understand the concepts of the present disclosure. Like reference numerals mainly refer to like elements throughout the specification. Terminologies used herein are for the purpose of describing particular example embodiments only and are not intended to be limiting. As used herein, the singular forms may be intended to include plural forms as well, unless the context clearly indicates otherwise. As used herein, the terms "comprises" and/or "comprising" are inclusive and therefore specify the presence of stated constituent elements, steps, operations, members, materials and/or components, but do not preclude the presence or addition of one or more other constituent elements, steps, operations, members, components, materials and/or elements thereof.

Hereinafter, a safety management system according to an embodiment of the present disclosure will be described.

FIG. 1 is a block diagram illustrating a safety management system according to an embodiment of the present disclosure.

Referring to FIG. 1, a safety management system according to an embodiment of the present disclosure includes a wearable device 100, big data 200, a safety management server 300, and a risk recognition subject 400.

First, the configuration of the wearable device 100 will be described with reference to FIG. 1.

The wearable device 100 may include a spectacle-shaped device, a ring-shaped device, a necklace-shaped device, a watch-shaped device, an insole-shaped device, an accessory-shaped device, a smart phone, or the like, which is worn on a user's body or carried by the user, and may detect the user's body conditions, the user's surroundings, and the like. For example, when a user has a smart phone, it is possible to obtain images of the user's surroundings, or to measure brightness of light, sound, and the like of the user's surroundings. The wearable device 100 includes a sensor 110 and a device communication unit 120.

Figure 2:
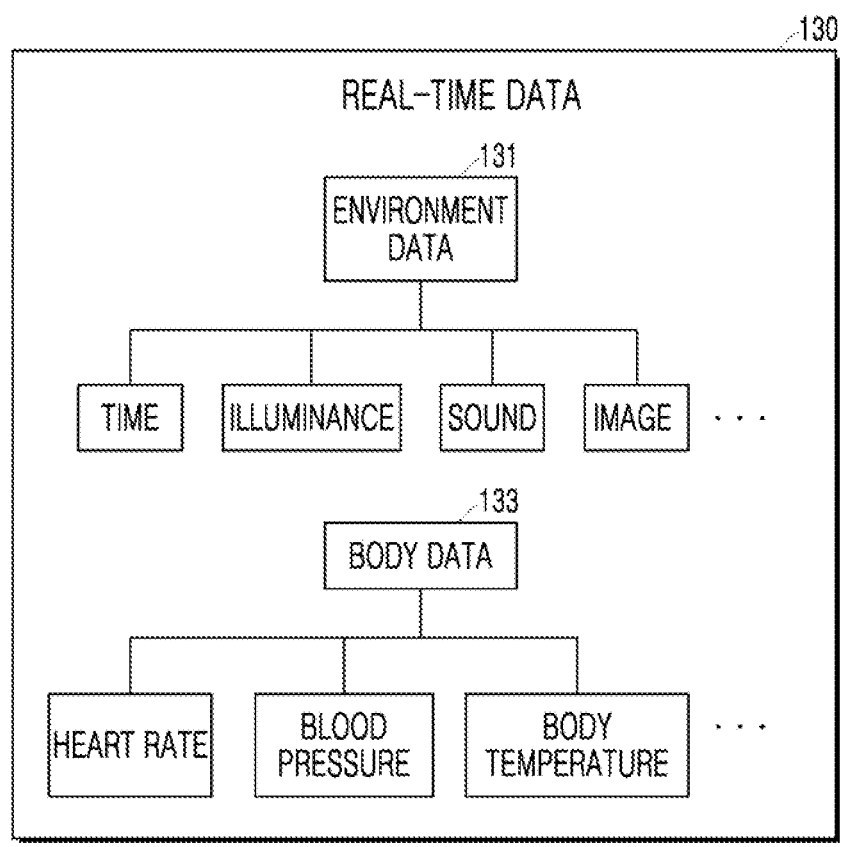
FIG. 2 is a block diagram illustrating real-time data transmitted from a wearable device of FIG. 1.

FIG. 2 is a block diagram illustrating real-time data transmitted from the wearable device of FIG. 1.

Referring to FIGS. 1 and 2, the sensor 110 is provided for measuring current data (hereinafter referred to as "real-time data"), such as the user's body conditions and the user's surroundings, and includes a blood-pressure sensor configured to measure the blood pressure of the user, a hear rate sensor, a light sensor configured to measure the brightness of light around the user, a position sensor configured to measure the position of the user, and a camera capable of capturing images of the surroundings of the user.

The real-time data 130 obtained via the sensor 110 includes the current time, data related to the environment, such as the brightness of the user's surroundings, sound of the user's surroundings, images of the user's surroundings (hereinafter referred to as "environment data"), data related to the user's body, such as the heart rate of the user, the blood pressure of the user, and the body temperature of the user (hereinafter, referred to as "body data"), and data related to the position information of the user.

In addition, the device communication unit 120 includes a communication module configured to perform data transmission/reception with an external server, and may transmit the real-time data 130 obtained via the sensor 110 to the safety management server 300.

Meanwhile, the device communication unit 120 may use a communication system optimized for transmitting/receiving data between the wearable device 100 and an external server.

For example, the device communication unit 120 may be configured to perform data transmission/reception with an external server using a 5G communication system (IMT 2020). When the device communication unit 120 uses the 5G communication system (IMT 2020), a data rate experienced by the user may be improved, a peak data rate may be improved, and a data transmission delay (latency) may be reduced.

Next, the configuration of the big data 200 will be described with reference to FIG. 1.

The big data 200 is data generated in a digital environment, and refers to large-scale data such as numerical values, characters, and images of various pieces of information including weather information, internet search history information, incident information, and traffic information. "Big data 200" refers to all types of data capable of being transmitted to the safety management server 300, and includes data related to a dangerous situation such as incident data 230 and criminal image data 250 (hereinafter, referred to as "risk data").

Figure 3:
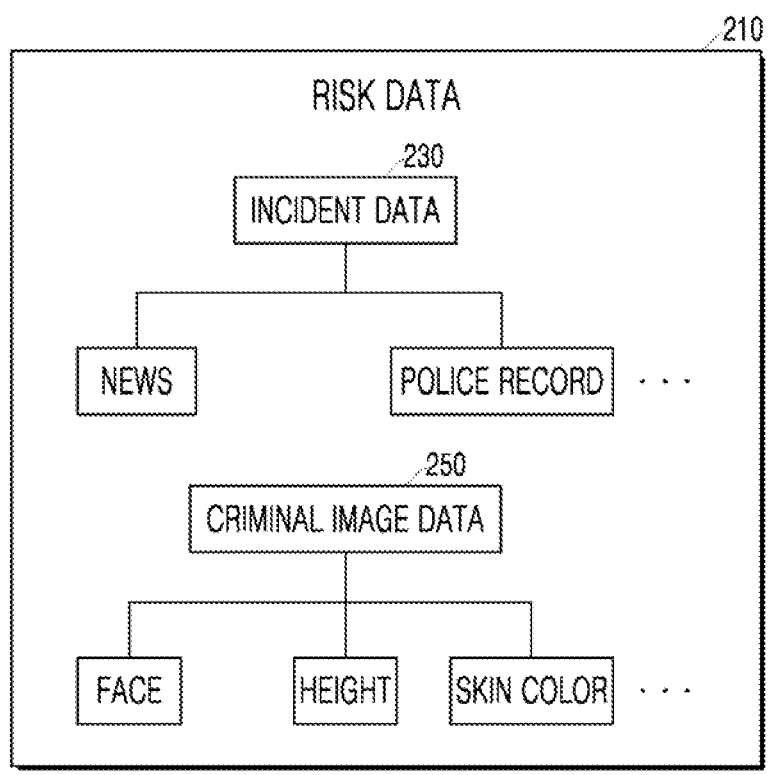
FIG. 3 is a block diagram illustrating risk data selected from big data of FIG. 1.

FIG. 3 is a block diagram illustrating risk data selected from the big data of FIG. 1.

Referring to FIGS. 1 and 3, the risk data 210 includes incident data 230 and criminal image data 250. The incident data 230 is information data regarding the type, the occurrence position, and the time of a safety accident, such as a traffic accident and a falling accident, and criminal incidents, such as a robbery and murder. In addition, the criminal image data 250 is image data related to body characteristics such as faces, heights, and skin colors of criminals or wanted persons who committed a criminal act such as a robbery or murder. The incident data 230 or the criminal image data 250 may be news or data stored in police records, or the like.

In addition, the risk data 210 may include data related to weather, astronomy, and the like, and data related to performances, events, and the like (hereinafter, referred to as "other data"). For example, the risk data 210 may include other data 270 related to weather phenomena, such as a typhoon, which may place the user in a dangerous situation, and the other data 270 related to festivals and events, which are held in specific areas and in which the user may enjoy his/her leisure time.

Next, the configuration of the safety management server 300 will be described with reference to FIG. 1.

The safety management server 300 calculates a server that performs functions of calculating a risk score based on data for determining whether a user is at risk (hereinafter, referred to as "risk determination data") and notifying the user of whether or not the user is at risk or the current risk of the user based on the calculated risk score. The safety management server 300 may be provided in a place spaced apart from the user or a smart phone or the like held by the user, and may include a server communication unit 310, an input unit 320, a storage 330, a calculator 340, and a determinator 350.

The server communication unit 310 may include a communication module or the like such so as to perform data transmission/reception with an external server, and may receive the real-time data 130 from the wearable device 100 or may receive the risk data 210 from the big data 200.

Meanwhile, the server communication unit 310 may use a communication system optimized for transmitting/receiving data between the safety management server 300 and an external server.

For example, the server communication unit 310 may be configured to perform data transmission/reception with an external server using a 5G communication system (IMT 2020). When the server communication unit 310 uses the 5G communication system (IMT 2020), a data rate experienced by the user may be improved, a peak data rate may be improved, and a data transmission delay (latency) may be reduced.

When it is determined by the safety management server 300 that the user is at risk, it is possible to transmit data, such as a text or a signal indicating that the user is at risk (hereinafter, referred to as a "dangerous situation message") to a subject who should be made aware of the dangerous situation of the user (hereinafter, referred to as a "risk recognition subject").

The risk determination data, including the real-time data 130 and the risk data 210 received by the server communication unit 310, is input to the input unit 320.

Meanwhile, the input unit 320 may include a specific information extraction module, and may selectively receive the risk data 210 among the data received from the big data 200. For example, the specific information extraction module may be set to select information that satisfies a specific keyword, a specific sentence, a specific retrieval expression, or the like so as to selectively receive data including the specific keyword or the specific sentence or retrieved in accordance with the specific retrieval expression.

The storage 330 stores the risk determination data input via the input unit 320. The safety management server 300 determines whether or not the user is at risk using the risk determination data stored in the storage 330.

Figure 4:
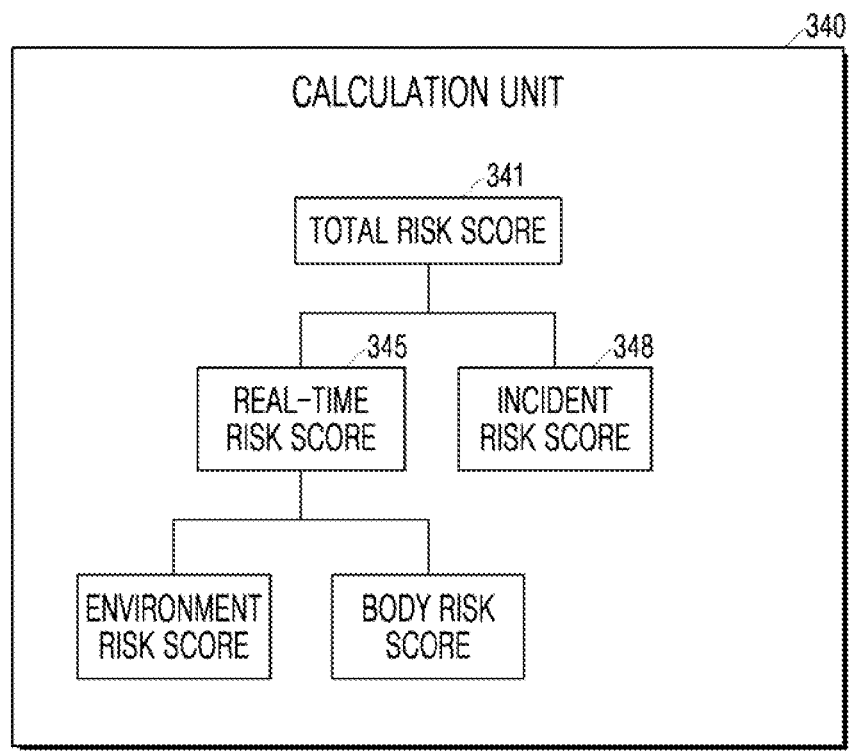
FIG. 4 is a block diagram illustrating a calculator of a safety management server of FIG. 1.

FIG. 4 is a block diagram illustrating a calculator of a safety management server of FIG. 1.

Referring to FIGS. 1 and 4, the calculator 340 calculates a risk score using the risk determination data.

Specifically, the calculator 340 may obtain a real-time risk score 345 and an incident risk score 348, and may calculate a total risk score 341 that indicates a risk level to the user as a numerical value by adding the real-time risk score 345 and the incident risk score 348.

For example, the calculator 340 first compares respective body data 133, respective environment data 131, and respective incident data 230 with preset risk score reference values for respective data, and calculates risk scores for respective body data, risk scores for respective environment data, and the risk score for each incident data. As an example of calculating the risk scores, the risk scores for respective body data may be calculated by comparing respective body data 133 with the risk score reference values for respective preset body data as shown in Table 1 below.

TABLE 1

| Body Data | Risk Score Reference Value | Risk Score |
|---|---|---|
| Body Temperature | Not lower than 35.5° C. and not higher than 37.0° C. | 0 |
| | 32° C.-35.5° C. or 37° C.-38.5° C. | 50 |
| | Not higher than 32° C. or not lower than 38.5° C. | 100 |
| Heart Rate | Not lower than 50 bpm and not higher than 100 bpm | 0 |
| | 100 bpm-160 bpm or not higher than 50 bpm | 50 |
| | Not lower than 160 bpm | 100 |

In Table 1 above, the risk scores for respective body data are calculated. However, the environment data 131 and the incident data 230 may also be compared with preset risk score reference values for respective environment data and preset risk score reference values for respective incident data so as to calculate the risk scores for respective environment data and the risk scores for respective incident data.

As an example of setting the risk score reference values for respective environment data, risk scores may be set depending on the brightness of light and the volume of sound, and as an example of setting the risk score reference values for respective incident data, when a crime, such as a robbery or murder, has occurred in the past within a preset distance from a user position, the risk score reference values may be set depending on the crime grades of respective crimes that occurred.

Next, the calculator 340 may calculate the body risk score by summing all the values obtained by multiplying the risk scores for respective body data by preset weights for respective predetermined body data, may calculate the environmental risk score by summing all the values obtained by multiplying the risk scores for respective environment data by preset weights for respective environment data, and may calculate the incident risk score 348 by summing all the risk scores obtained by multiplying the risk scores for respective incident data by preset weights for respective incident data.

In addition, the calculator 340 may obtain the real-time risk score 345 by summing the body risk score and the environmental risk score, and may calculate the total risk score 341 by summing the real-time risk score 345 and the incident risk score 348.

The method for calculating the total risk score 341 can be expressed by Equation 1 or a mathematical calculation formula.

$$\Sigma(De \times Pe) + \Sigma(Db \times Pb) + (Da \times Pa) \qquad \text{[Equation 1]}$$

(wherein "De" is an environment data risk score, "Pe" is an environment data weight, "Db" is a body data risk score, "Pb" is a body data weight, "Da" is an incident data risk score, and Pa is an incident data weight)

$$\Sigma(Dr \times Pr) + \Sigma(Da \times Pa) \qquad \text{[Mathematical Formula]}$$

(wherein "Dr" is a real-time data risk score, "Pr" is a real-time data weight, "Da" is an incident data risk score, and "Pa" is an incident data weight)

Meanwhile, the weights for respective body data, the weights for respective environment data, and the weights for respective incident data may be arbitrarily set by the user or may be set in consideration of a specific situation.

For example, the weights for respective body data and the weights for respective environment data may be set in proportion to the reliability of the wearable device 100. The reliability of the wearable device 100 may be set in consideration of the time, the position of the user, the surrounding environment of the user, and the like.

As an example of setting the reliability of the wearable device 100 in consideration of the time, in a daytime period in which the user is mainly active in a bright place, the reliability of the wearable device 100 that provides illumination information and image information is set to be high, and in a night time period in which the user is mainly in the dark or sleeps, the reliability of the wearable device 100 that provides sound information is set to be high.

For example, the reliability of the wearable device 100 may be set in consideration of the time as shown in Table 2 below.

TABLE 2

| Type of Wearable Device | Time | Reliability of Wearable Device | |
|---|---|---|---|
| Smart Eyeglasses (Illuminance Information) | 09:00-17:00 | Concerning illuminance data | 100 |
| | 17:00-24:00 | Concerning illuminance data | 70 |
| | 24:00-09:00 | Concerning illuminance data | 30 |
| Smart Earphone (Sound Information) | 09:00-17:00 | Concerning illuminance data | 70 |
| | 17:00-24:00 | Concerning illuminance data | 60 |
| | 24:00-09:00 | Concerning illuminance data | 90 |

As an example of setting the reliability of the wearable device 100 in consideration of the position of the user, when the user is on a secluded mountain or the like, the risk caused due to abnormalities in the user's own body may be greater than the risk caused due to external factors, and thus, the reliability of the wearable device 100 that provides information on the body data 133 is set to be high. In contrast, when the user is downtown, the risk caused due to external factors such as the surrounding environment may be greater than the risk caused due to abnormalities in the user's own body, and thus the reliability of the wearable device 100 that provides the environment data 131 set to be high.

For example, the reliability of the wearable device 100 may be set in consideration of the time, as shown in Table 3 below.

TABLE 3

| Type of Wearable Device | Position of User | Reliability of Wearable Device | |
|---|---|---|---|
| Blood-pressure Gauge (Blood-pressure Measurement) | Downtown | Concerning blood pressure data | 80 |
| | Suburb | Concerning blood pressure data | 100 |
| Smart Eyeglasses (Illumination Measurement) | Downtown | Concerning illuminance data | 90 |
| | Suburb | Concerning illuminance data | 70 |

When the reliability of the wearable device 100 is set as described above, it is possible to set weights for respective real-time data 130 by assigning a high weight to information provided from the wearable device 100, the reliability of which is set to be high, and assigning a low weight to the information provided from the wearable device 100, the reliability of which is set to be low.

For example, as shown in the following Table 4, weights may be assigned to respective environment data 131 measured by respective wearable devices 100 in consideration of the reliabilities of the wearable devices 100.

TABLE 4

| Type of Wearable Device | Reliability of Wearable Device | | Data weight | |
|---|---|---|---|---|
| Smart Eyeglasses | Concerning Illuminance data | 0.3 | Illuminance data | 30 |
| | Concerning sound data | 0.4 | Sound data | 40 |
| Smart Phone | Concerning illuminance data | 0.7 | Illuminance data | 70 |
| | Concerning sound data | 0.2 | Sound data | 20 |

As another example, the weights for respective incident data may be set in consideration of the position and the time at which an incident occurred.

As an example of setting weights for respective incident data in consideration of the position at which an incident occurred, when the position of the user is close to the position where a safety accident such as a falling accident or a criminal incident such as a robbery occurred, the weight of the incident data 230 may be set to be high, and when the position of the user is far from a position where a safety accident or a criminal incident has occurred, the weight of the incident data 230 may be set to be low.

As an example of setting weights for respective incident data in consideration of the time when an incident occurred, when a time difference between the time at which a safety accident such as a falling accident or a criminal incident such as a robbery occurred and the time when the position of the user was measured is small, the weight of the incident data 230 may be set to be high, and when the time difference between the time at which a safety accident or a criminal incident occurred and the time at which the position of the user was measured is large, the weight of the incident data 230 may be set to be low.

For example, as shown in Table 5 below, weights may be assigned to the incident data in consideration of the position where an incident occurred.

TABLE 5

| Type of Incident | Distance from User | Weight of Incident Data |
|---|---|---|
| Falling Accident | 40 m | 0.3 |
| | 10 m | 0.8 |
| Robbery Incident | 40 m | 0.2 |
| | 10 m | 0.6 |

Figure 5:
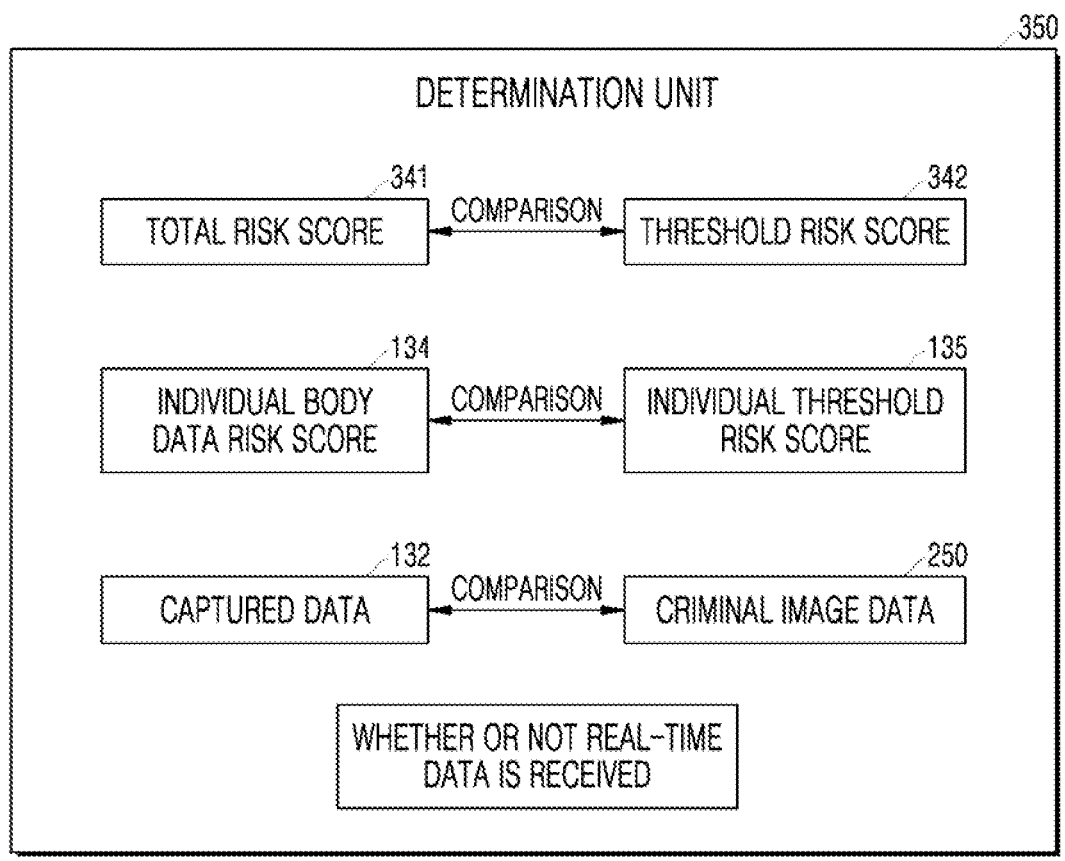
FIG. 5 is a block diagram illustrating a determinator of the safety management server of FIG. 1.

FIG. 5 is a block diagram illustrating a determinator of the safety management server of FIG. 1.

Referring to FIGS. 1 and 5, the determinator 350 may include an image determination module configured to determine whether or not a user is in a dangerous situation, and to compare image data in order to determine whether or not the image data is identical.

More specifically, the determinator 350 may determine whether or not the user is in a dangerous situation or may determine the risk level of the user's current situation using the total risk score 341 and the individual body data risk score calculated by the calculator 340, the image data obtained by capturing persons around the user by the sensor 110 (hereinafter, referred to as "captured data"), and whether or not real-time data 130 is received from the wearable device 100.

As an example in which the determinator 350 determines whether or not the user is in a dangerous situation using the total risk score 341, the determinator 350 may compare the total risk score 341 with a predetermined threshold risk score 342, and may determine that the user is in a dangerous situation when the total risk score 341 is equal to or greater than the predetermined threshold risk score 342.

In addition, the determinator 350 may further determine whether or not the user is at risk using the individual body data risk score in addition to the total risk score. For example, when the user's blood pressure data risk score is equal to or greater than the blood pressure threshold risk score among the predetermined individual threshold risk scores, the determinator 350 may determine that the user is in a dangerous situation.

Meanwhile, the determinator 350 may determine whether or not the user is in a dangerous situation using the captured data and the criminal image data 250 stored in the storage 330. For example, when it is determined that the captured data is identical to the criminal image data 250 as a result of comparing the captured data with the criminal image data 250 using the image discrimination module, the user 350 may determine that the user is in a dangerous situation because there is a criminal around the user.

When real-time data 130 is not received from the wearable device 100, the determinator 350 may determine that the user is in a dangerous situation by estimating that the wearable device 100 fails or is forcibly separated from the user because the user is in trouble due to a physical shock or the like applied to the user.

In addition to determining whether or not the user is in a dangerous situation, the determinator 350 may determine the risk level of the current situation of the user. For example, the determinator 350 may determine the risk level of the current situation of the user by comparing the total risk score 341 with predetermined risk levels for respective risk scores.

When it is determined by the determinator 350 that the user is in a dangerous situation, the server communication unit 310 may transmit a signal, a text, or a notification indicating that the user is in a dangerous situation (hereinafter, referred to as a "dangerous situation message") to the risk recognition subject 400. Even when it is determined by the determinator 350 that the user is not in a dangerous situation, the server communication unit 310 may notify the risk recognition subject 400 of the risk level of the current status of the user, which is determined by the determinator 350.

The safety management server 300 described above may be implemented using an artificial neural-network algorithm. The artificial neural-network algorithm is a machine learning scheme in which an artificial intelligence system learns by itself.

When the safety management server 300 is implemented using an artificial neural-network algorithm, it is possible to improve the suitability of risk score calculation of the server 300 by causing the safety management server to learn the environment risk score, the body risk score, and the incident risk score calculated appropriately for each specific situation. Therefore, since the risk score calculated for each situation is appropriately calculated depending on the situation, it is possible to improve the user risk determination accuracy of the safety management server 300, which determines whether the user is at risk based on the risk score.

Next, the configuration of the risk recognition subject 400 will be described with reference to FIG. 1.

The risk recognition subject 400 includes subjects such as a user, the user's family, and a police station as subjects to be made aware of the dangerous situation of the user or the risk level of the current situation of the user. The risk recognition subject 400 may receive information related to the dangerous situation of the user and may respond appropriately based on the received information. For example, the user may move to another position based on information related to his/her own dangerous situation, and a family member may report to a rescue institution, a police station, or the like based on information related to the user's dangerous situation.

The risk recognition subject 400 may receive a dangerous situation message transmitted from the safety management server 300 through communication means such as a terminal and a telephone carried by the risk recognition subject 400.

Hereinafter, a safety management method according to an embodiment of the present disclosure will be described.

Figure 6:
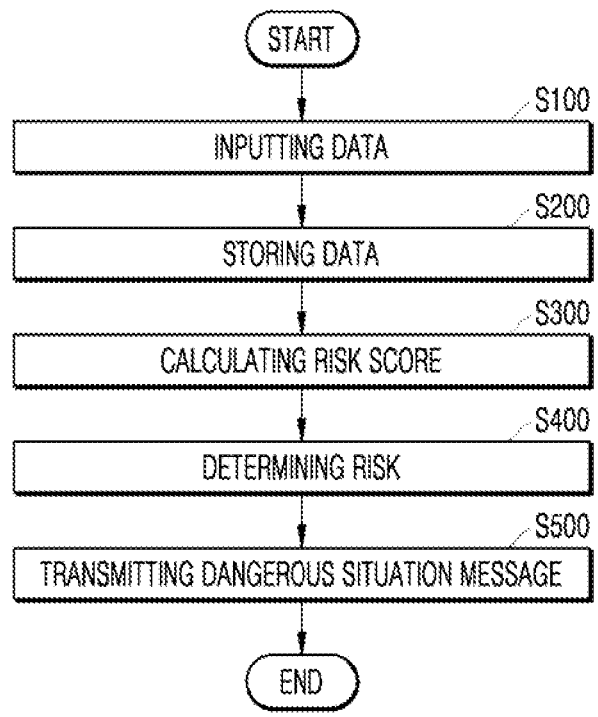
FIG. 6 is a flowchart illustrating a safety management method according to another embodiment of the present disclosure.

FIG. 6 is a flowchart illustrating a safety management method according to another embodiment of the present disclosure.

Referring to FIG. 6, a safety management method according to an embodiment of the present disclosure includes a data input step (S100), a data storage step (S200), a risk score calculation step (S300), a risk determination step, and a dangerous situation message transmission step (S500).

Figure 7:
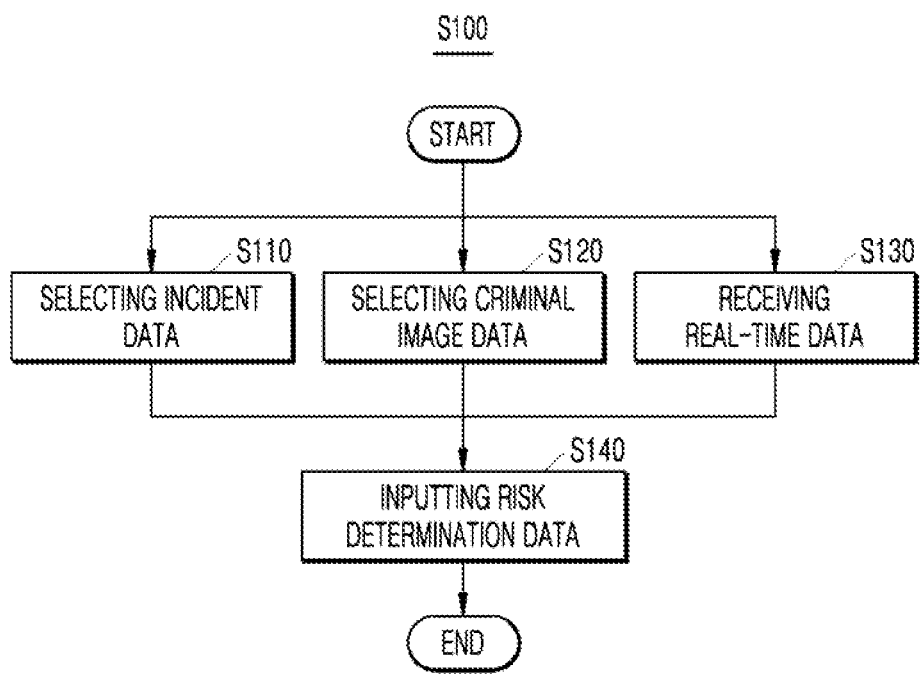
FIG. 7 is a flowchart illustrating the data input step of FIG. 6.

FIG. 7 is a flowchart illustrating the data input step of FIG. 6.

First, the configuration of the data input step S100 will be described with reference to FIGS. 1 to 3, 6, and 7.

Referring to FIG. 7, the data input step (S100) includes a step of selecting incident data 230 from the big data 200 (S110), a step of selecting criminal image data 250 from the big data 200 (S120), a step of receiving the real-time data 130 from the wearable device 100 (S130), and a step of receiving the risk determination data (S140).

The wearable device 100, the configuration of the real-time data 130, the configuration of the big data 200, and the configuration of the risk data 210 are as described above in the description of the safety management system of the present disclosure.

Next, the data storage step S200 will be described with reference to FIG. 6.

In the data storage step S200, the risk determination data including the input incident data 230, the criminal image data 250, and the real-time data 130 are stored.

Figure 8:
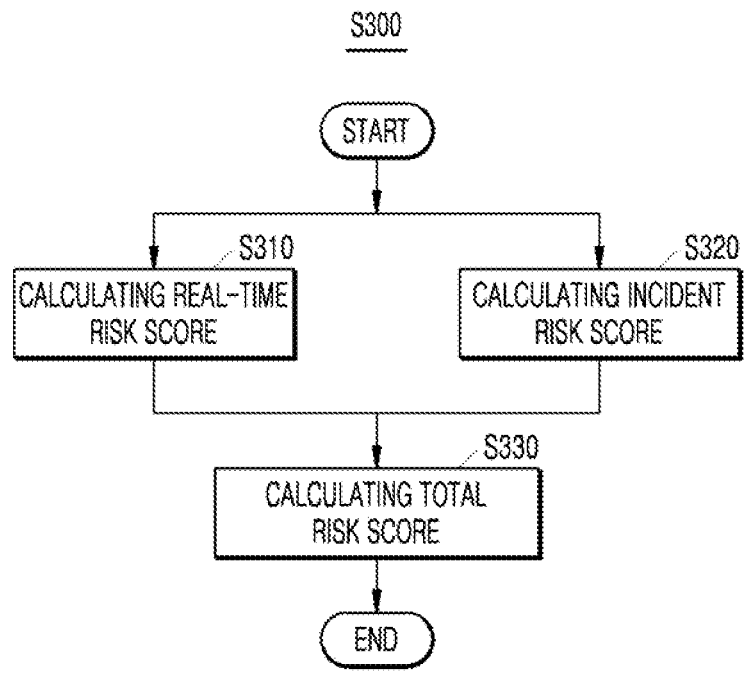
FIG. 8 is a flowchart illustrating the risk score calculation step of FIG. 6.
Figure 9:
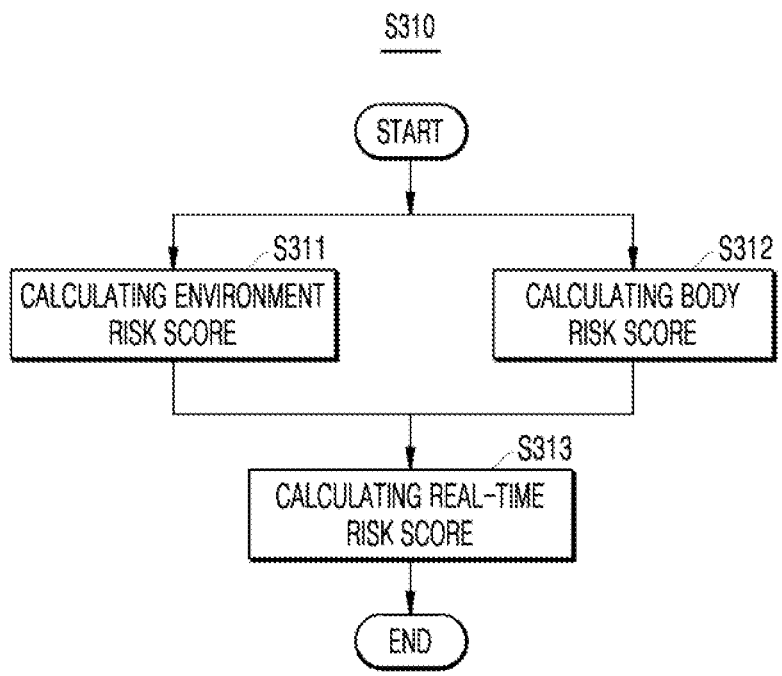
FIG. 9 is a flowchart illustrating the real-time risk score calculation step of FIG. 8.

FIG. 8 is a flowchart illustrating the risk score calculation step of FIG. 6, and FIG. 9 is a flowchart illustrating the real-time risk score calculation step of FIG. 8.

Next, the configuration of the risk score calculation step S300 will be described with reference to FIGS. 4, 8, and 9.

Referring to FIG. 8, the risk score calculation step S300 may include a step of calculating the real-time risk score 345 using the real-time data 130 (S310), a step of calculating the incident risk score 348 using the incident data 230 (S320), and a step of calculating the total risk score 341 by adding the real-time risk score 345 and the incident risk score 348 (S320).

More specifically, in the risk score calculation step S300, the total risk score 341 indicating the risk level of the user using a numerical value may be calculated using the real-time data 130 and the incident data 230.

Referring to FIG. 9, the step of calculating the real-time risk score 345 (S310) includes a step of calculating the environmental risk score (S311) and a step of calculating of the body risk score (S312).

The methods for calculating the body risk score, the environmental risk score, the real-time risk score 345 the incident risk score 348, and the total risk score 341 are as described above in the description of the safety management system of the present disclosure.

Figure 10:
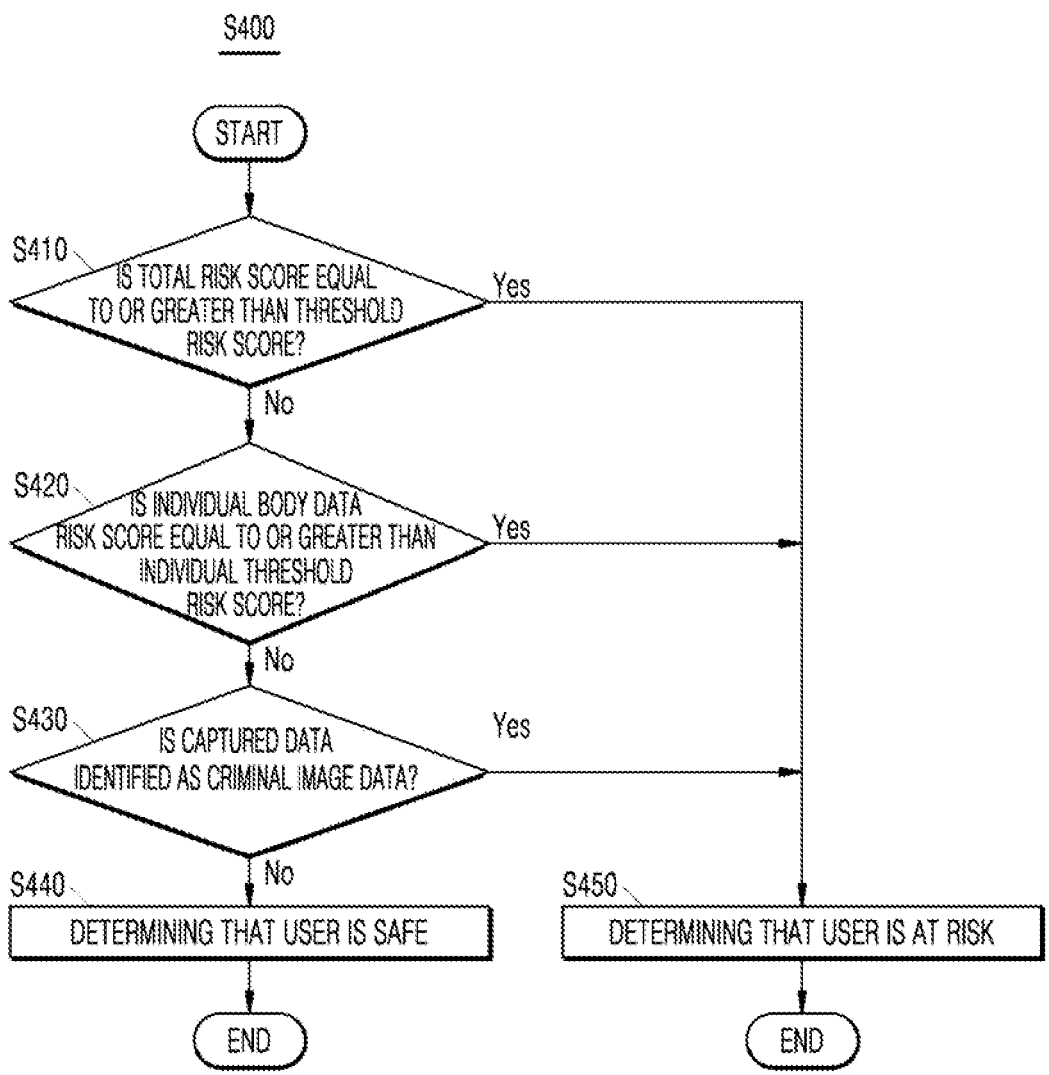
FIG. 10 is a flowchart illustrating the risk determination step of FIG. 6.

FIG. 10 is a flowchart illustrating the risk determination step of FIG. 6.

Next, the configuration of the risk determination step S400 will be described with reference to FIGS. 5, 6, and 10.

Referring to FIG. 10, the risk determination step S400 includes a first step of determining whether or not the total risk score is equal to or greater than a threshold risk score (S410), a second step of determining whether or not the individual body data risk score is equal to or greater than an individual threshold risk score (S420), a third step of determining whether or not the captured data is identified as criminal image data (S430), a fourth step of determining that that the user is safe (S440), and a fifth step of determining that the user is at risk (S450).

In the first step S410, the total risk score 341 is compared with the predetermined threshold risk score 342, and when the total risk score 341 is equal to or greater than the predetermined threshold risk score 342, it is determined that the user is at risk (the fifth step).

In the second step S420, it is determined that the user is at risk when the individual body data risk score is equal to or greater than the preset individual threshold risk score, such as the blood pressure threshold risk score (the fifth step).

In the third step S430, when it is determined that the captured data is identical to the criminal image data 250 as a result of comparing the captured data with the criminal image data 250 using the image determination module, it is determined that the user is at risk (the fifth step).

Although not illustrated in the drawings, the risk determination step S400 may include a sixth step of determining whether or not real-time data 130 is received from the wearable device 100, and when it is determined that real-time data 130 is not received from the wearable device 100, it may be determined that the user is at risk (fifth step).

In addition, the risk determination step (S400) may include a seventh step of comparing the total risk score 341 with the risk levels for predetermined respective risk scores to determine the risk level of the current situation of the user.

The first, second, third, and sixth steps may be configured in a different order. When it is determined that the user is not at risk in each of the first, second, third, and sixth steps, in the risk determination step S400, it may be determined that the user is safe (step 4).

Next, the configuration of the dangerous situation message transmission step S500 will be described with reference to FIG. 6.

When it is determined that the user is at risk in the risk determination step S400, in the dangerous situation message transmission step S500, a signal, a text, or a notification indicating that the user is in a dangerous situation (hereinafter, referred to as a "dangerous situation message") may be transmitted to the risk recognition subject 400. Even when it is determined in the risk determination step S400 that the user is not in a dangerous situation, the risk recognition subject 400 may be notified of the risk level of the current status of the user, which is determined in the risk determination step S400, in the dangerous situation message transmission step S500.

The configuration of the risk recognition subject 400 and the method of receiving the risk status message by the risk recognition subject 400 are as described above in the description of the safety management system of the present disclosure.

Hereinafter, actions and effects of the safety management system and method according to the present disclosure will be described.

First, the real-time data measured by the wearable device and the risk data selected from the big data are input into the safety management server or in the data input step. The input risk determination data is stored in the storage of the safety management server or in the data storage step.

In addition, the real-time data risk score, the incident data risk score, and the total risk score are calculated by the calculator of the safety management server or in the risk store calculation step using the risk determination data.

By the determinator of the safety management server or in the risk determination step, the calculated total risk score is compared with a preset threshold risk score and the individual body data risk score is compared with the preset individual threshold risk score in order to determine whether or not the user is at risk and to determine the risk level of the current situation of the user. By the determinator of the safety management server or in the risk determination step, it may be determined whether or not the user is at risk based on whether or not real-time data is received from the wearable device, and it may be determined whether or not the user is at risk by identifying whether or not a criminal is present in the vicinity of the user.

By the server communication unit of the safety management server or in the dangerous situation message transmission step, a dangerous situation message is transmitted to the risk recognition subject when it is determined that the user is at risk by the determination of the safety management server or in the determination step.

As described above, according to the safety management system and the method of the present disclosure, it is possible to improve risk determination accuracy by considering real-time data and incident data together in order to determine whether the user is at risk.

In addition, since the reliability of a wearable device and a real-time data weight are set differently depending on the user's situation, it is possible to improve the risk determination accuracy by considering the specific situation of the user.

In addition, since the incident data weight is set differently depending on the distance between the incident occurrence position and the position of the user, it is possible to improve the accuracy of calculation of the probability of occurrence of an incident and the risk determination accuracy.

In addition, in determining the risk of the user, the total risk score and the individual body data risk score are taken into consideration together. Thus, it is possible to improve the risk determination accuracy depending on the individual dangerous situation, and to protect the user more assuredly.

In addition, since the case in which real-time data is not received from the wearable device carried by the user in order to determine whether or not the user is at risk is considered, it is possible to take measures to protect the user when the wearable device fails or is forcibly separated from the user because the user is in trouble.

Furthermore, it is possible to avoid a place in which the user is likely to be in a dangerous situation since it is determined whether the user is at risk based on whether or not a criminal is present in the vicinity of the user.

While the present disclosure has been described in detail with reference to representative embodiments thereof, it will be clearly understood by a person ordinarily skilled in the art that the above-described embodiments can be variously changed or modified without departing from the scope of the present disclosure. Therefore, the scope of the present disclosure should not be limited to the described embodiments, but should be determined by all changes or modifications derived from the scope of the appended claims and concepts equivalent to the scope of the appended claims.

What is claimed is:
1. A safety management system comprising:
a wearable device including a plurality of sensors configured to measure body data related to a user and environment data related to an environment of the user, and a device communication unit configured to perform data transmission or reception with a safety management server, wherein the plurality of sensors include a camera configured to capture an image of surroundings of the user, the environment data includes captured image data; and
the safety management server including:
a server communication unit configured to:
receive incident data for determining whether the user is at risk, the body data and the environment data, and
receive criminal image data to determine whether the user is at risk,
a controller configured to:
compare each of the body data, the environmental data, and the incident data with preset risk score reference values to generate a comparison result,
calculate a body data risk score, an environment data risk score and an incident data risk score according to the comparison result,
calculate a total risk score of the user based on the body data risk score, the environment data risk score and the incident data risk score,
determine that the user is at risk depending on whether the total risk score is equal to or greater than a predetermined threshold risk score,
control, when the user is at risk, the server communication unit to transmit a dangerous situation message that the user is in a dangerous situation to a communication unit of a risk recognition subject, and in response to determining that the captured image data is equal to the criminal image data, determine that the user is at risk and transmit the dangerous situation message to the communication unit of the risk recognition subject, wherein the safety management server is implemented using an artificial neural-network algorithm, wherein the controller is configured to calculate the total risk score using Equation 1 below:

$$\Sigma(De \times Pe) + \Sigma(Db \times Pb) + (Da \times Pa) \qquad \text{[Equation 1]}$$

wherein "De" is the environment data risk score, "Pe" is an environment data weight, "Db" is the body data risk score, "Pb" is a body data weight, "Da" is the incident data risk score, and Pa is an incident data weight, and wherein the controller is configured to perform a learning update based on the total risk score to generate an updated artificial neural-network algorithm.

2. The safety management system of claim 1, wherein the environment data includes at least one of time information, illuminance information, sound information, and position information, the body data includes at least one of heart rate information, blood pressure information, and body temperature of the user, and the incident data includes at least one of safety accident information and criminal incident information.

3. The safety management system of claim 2, wherein the environment data weight and the body data weight are set in proportion to reliability of the wearable device, the reliability of the wearable device is set based on at least one of time information, user position information, and user surrounding-environment information, and the incident data weight is set in inverse proportion to a distance between a user position and an incident occurrence position.

4. The safety management system claim 1, wherein the controller is configured to determine that the user is at risk when the body data risk score is equal to or greater than a preset individual threshold risk score.

5. The safety management system of claim 1, wherein, when the environment data and the body data are not received from the wearable device, the controller determines that the user is at risk.

6. The safety management system of claim 1, wherein at least one of the server communication unit and the device communication unit is configured to perform data transmission or reception with an external device using a 5G communication system.

7. The safety management system of claim 1, wherein the controller is configured to compare the total risk score with a preset risk level for each risk score to determine a risk level of the user's environment, and the server communication unit is configured to transmit the determined risk level of the user's environment to the communication unit of the risk recognition subject.

8. A safety management method comprising:

receiving, by a server communication unit included on a safety management server, body data related to a user and environment data related to an environment of the user measure through a wearable device carried by the user including a plurality of sensors configured to measure body data related to a user and environment data related to an environment of the user, and incident data for determining whether the user is at risk, wherein the plurality of sensors include a camera configured to capture an image of surroundings of the user, the environment data includes captured image data;

receiving, by the server communication unit, criminal image data to determine whether the user is at risk;

comparing, by a controller included on the safety management server, each of the body data, the environmental data, and the incident data with preset risk score reference values to generate a comparison result;

calculating, by the controller, a body data risk score, an environment data risk score and an incident data risk score according to the comparison result;

calculating, by the controller, a total risk score of the user based on the body data risk score, the environment data risk score and the incident data risk score;

determining, by the controller, that the user is at risk depending on whether the total risk score is equal to or greater than a predetermined threshold risk score;

when the user is at risk, controlling, by the controller, the server communication unit to transmit a dangerous situation message that the user is in a dangerous situation to a communication unit of a risk recognition subject;

in response to determining, by the controller, that the captured image data is equal to the criminal image data, determining that the user is at risk and transmitting the dangerous situation message to the communication unit of the risk recognition subject, wherein the safety management server is implemented using an artificial neural-network algorithm, wherein in the calculating, the total risk score is calculated using Equation 1 below:

$$\Sigma(De \times Pe) + \Sigma(Db \times Pb) + (Da \times Pa) \qquad \text{[Equation 1]}$$

wherein "De" is the environment data risk score, "Pe" is an environment data weight, "Db" is a body data risk score, "Pb" is the body data weight, "Da" is the incident data risk score, and Pa is an incident data weight, and wherein the safety management method further includes performing, by the controller, a learning update based on the total risk score to generate an updated artificial neural-network algorithm.

9. The safety management method of claim 8, wherein the environment data includes at least one of time information, illuminance information, and sound information, the body data includes at least one of heart rate information, blood pressure information, and a body temperature of the user, and the incident data comprises at least one of safety accident information and criminal incident information.

10. The safety management method of claim 9, wherein the environment data weight and the body data weight are set in proportion to reliability of the wearable device, the reliability of the wearable device is set based on at least one of time information, user position information, and user surrounding-environment information, and the incident data weight is set in inverse proportion to a distance between a user position and an incident occurrence position.

11. The safety management method of claim 8, wherein, in the determining, it is determined that the user is at risk when the body data risk score is equal to or greater than a preset individual threshold risk score.

12. The safety management method of claim 8, wherein, in the determining, it is determined that the user is at risk when the environment data and the body data are not received from the wearable device.

13. The safety management method of claim 8, wherein, in the determining, the total risk score is compared with a preset risk level for each risk score so as to determine a risk level of the user's environment, and in the transmitting, the determined risk level of the user's environment is transmitted to the communication unit of the risk recognition subject.

14. The safety management method of claim 8, wherein, in the receiving, the body data and the incident data are received by the server communication unit using a 5G communication system, and in the transmitting, the dangerous situation message is transmitted to the communication unit of the risk recognition subject using the 5G communication system.

\* \* \* \* \*